United States Patent [19]
Gorosave

[11] Patent Number: 5,823,360
[45] Date of Patent: Oct. 20, 1998

[54] DEVICE FOR HOLDING SPORTS EQUIPMENT AND OTHER ITEMS

[76] Inventor: Daniel R. Gorosave, 1140 7th Ave. South, Edmonds, Wash. 98020

[21] Appl. No.: 655,741

[22] Filed: May 30, 1996

[51] Int. Cl.[6] .................................................. A47F 7/00
[52] U.S. Cl. ........................... 211/13.1; 211/14; 211/113; 211/74; 211/87.01; 248/311.2; 248/304; D6/552
[58] Field of Search .............................. 211/13.1, 14, 113, 211/71.01, 74, 87.01; 248/311.2, 214, 304; D6/552

[56] References Cited

U.S. PATENT DOCUMENTS

| | | | |
|---|---|---|---|
| D. 245,214 | 8/1977 | Allen | D6/552 |
| D. 356,002 | 3/1995 | Morgan | D6/552 |
| 750,063 | 1/1904 | Redding | 211/74 |
| 1,343,363 | 6/1920 | Hall | 211/74 |
| 1,446,036 | 2/1923 | Dodd | 211/71 |
| 1,648,528 | 11/1927 | Ziringer | 211/71 X |
| 2,570,504 | 10/1951 | Van House | 211/14 X |
| 4,096,951 | 6/1978 | Menssen | 211/71 X |
| 5,074,571 | 12/1991 | Reese | 211/14 X |
| 5,152,489 | 10/1992 | Christensen et al. | 211/14 X |
| 5,181,555 | 1/1993 | Chruiak | 248/311.2 X |
| 5,222,597 | 6/1993 | Bluthardt et al. | 211/14 X |
| 5,232,101 | 8/1993 | Shaftner et al. | D6/552 |
| 5,320,263 | 6/1994 | Kobylack | 248/311.2 X |

*Primary Examiner*—Donald P. Walsh
*Assistant Examiner*—Emmanuel M. Marcelo
*Attorney, Agent, or Firm*—Zackery Legal Group

[57] ABSTRACT

A device (10) for holding items, such as sports equipment, beverage containers, clothing, jewelry and etc., includes a support member (27). The support member includes a connector (28) at its upper end for connecting the device to another structure, such as a chain link fence (25), and supporting the device from this structure. The device additionally includes a first receptacle (23) connected to the support member for receiving and retaining a beverage container (12). The device further includes a second receptacle (16), (38) or (64) connected to the support member for receiving and retaining a ball or balls (14), (40) or (66). In one embodiment, a pair of prongs (72) and (74) cantilever from the lower end of the support member for holding sports equipment, such as a bat (76).

19 Claims, 3 Drawing Sheets

DEVICE FOR HOLDING SPORTS EQUIPMENT AND OTHER ITEMS

FIELD OF THE INVENTION

The present invention relates generally to holding devices, and in particular to devices for holding sports equipment and other items.

BACKGROUND OF THE INVENTION

Many people participate in sports activities at public facilities. For example, most communities have athletic fields available for public use for baseball, softball, soccer, football and other sports. Typically, these communities have publicly available facilities as well for other athletic activities, such as basketball, tennis, volleyball or other sports that may require a court, rather than a field. Also, most people have access to private organizations that provide such facilities. For example, many health clubs have courts for basketball, volleyball, tennis and other sports that their members may use.

Most of these playing areas, though, whether at a park, health club, or other location, frequently do not provide a means near the playing area for storing personal items. Before participating in an athletic event, people often remove personal items, such as eye glasses, watches, rings and etc., to avoid damaging these items, and/or to avoid causing injuries with these items during play. However, these personal items usually have at least some monetary and/or sentimental value, are small and therefore easily lost. Many of these items are fragile as well as small, and if not stored out of the way, are subject to being overlooked, stepped on, and damaged. Storing these items is generally most problematic at community playing areas, such as a baseball field or basketball court at a park.

Additionally, sports participants often drink and eat during the course of an athletic event. For example, sports participants frequently have a beverage container for liquid refreshment during a game. Frequently, sport participants eat during the course of a game, either for energy to enhance athletic performance, for social reasons, or simply because of hunger. In this regard, many people participate in sports event at the end of the work day and often arrive at the playing field without having had a chance to eat dinner. During a game, sport participants generally store their beverage containers and/or food near the playing area. However, problems arise due to the containers and/or food being kicked, stepped on, and etc., resulting in messes and the liquid refreshment and/or food being made unfit for consumption.

Further, sports participants generally have gear they need to store near the playing area for easy access. For example, baseball or softball players wear mitts that they remove when their team is at bat. Frequently, these players also have their own bat, ball and other equipment. Tennis players typically bring extra tennis balls, and/or a racket to the tennis court. However, the playing areas generally do not provide facilities for storing this gear. So the sports participants generally lay their gear on the ground or floor near the playing area, resulting in untidiness, hazards due to people tripping over the gear, and possible loss of, or damage to the gear.

Previous patents have addressed the problem of providing storage for athletic gear near a playing field. For example, U.S. Pat. No. 4,193,495 discloses a portable sports equipment organizer having a centrally hinged support board. Hooks extend from opposite corners of the board for suspending the device from a chain link fence. U-shaped clamps extend from along the face of the board. Each clamp is sized such that it can capture the handle of a baseball bat for hanging a bat from the clamp. Other U-shaped clamps extend from the face of the board for holding a baseball. Additionally, the device includes opposing L-shaped fingers for holding a baseball helmet, and has hooks for holding other gear, such as shin guards or mitts.

While satisfactory for some uses, the device has several problems. First, the device is suitable only for holding gear for several players. That is, the device is not for individual use, and in this regard, is too heavy, bulky, and expensive for an individual. Further the device does not provide for storing personal items such as eye-glasses, watches, and other items. Nor does it provide for storing beverage containers.

U.S. Pat. No. 4,598,891 discloses a wire-frame racket and ball holder. The device includes a single hook at its upper end for supporting the device from a closet rod. The lower end of the device forms a basket arrangement for holding cylindrical ball containers. The lower end of the device also forms a projecting loop for supporting rackets. While an individual may use this device, it has limited applicability because its adapted for storing tennis gear in a closet, and not near a tennis court. Nor does it address the problem of storing personal items, or the problem of storing beverage containers.

The present invention accordingly provides an improved solution to problems discussed in the preceding paragraphs.

SUMMARY OF THE INVENTION

The present invention provides a device for holding items, such as sports equipment, beverage containers, clothing, jewelry and etc. The device includes a support member having a connector at its upper end for connecting the device to another structure, such as a chain link fence, and supporting the device from this structure. Preferably, the connector is in the form of a hook.

The device additionally includes a first receptacle connected to the support member for receiving and retaining a beverage container. The device further includes a second receptacle connected to the support member for receiving and retaining a ball or balls.

In one embodiment, a pair of prongs cantilever from the lower end of the support member for holding sports equipment, such as a bat, racket, baseball or softball mitts, clothing, or other items. This embodiment also includes a container connected to the support member, with the container having an opening through which items, such as jewelry, may be received into the container, and a lid for closing the opening. Optionally, a mirror may be mounted to the lid of the container.

In two other embodiments, the ball receptacle connects to the lower end of the support member, rather than a pair of prongs. In one of these two embodiments, the ball receptacle includes a lid for opening and closing the receptacle.

The other of these two embodiments includes a receptacle that receives a plurality of balls of a predefined diameter. This receptacle includes an opening for receiving the balls, with the opening having a diameter smaller than the diameter of the balls for force-fitting the balls through the opening into the receptacle.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
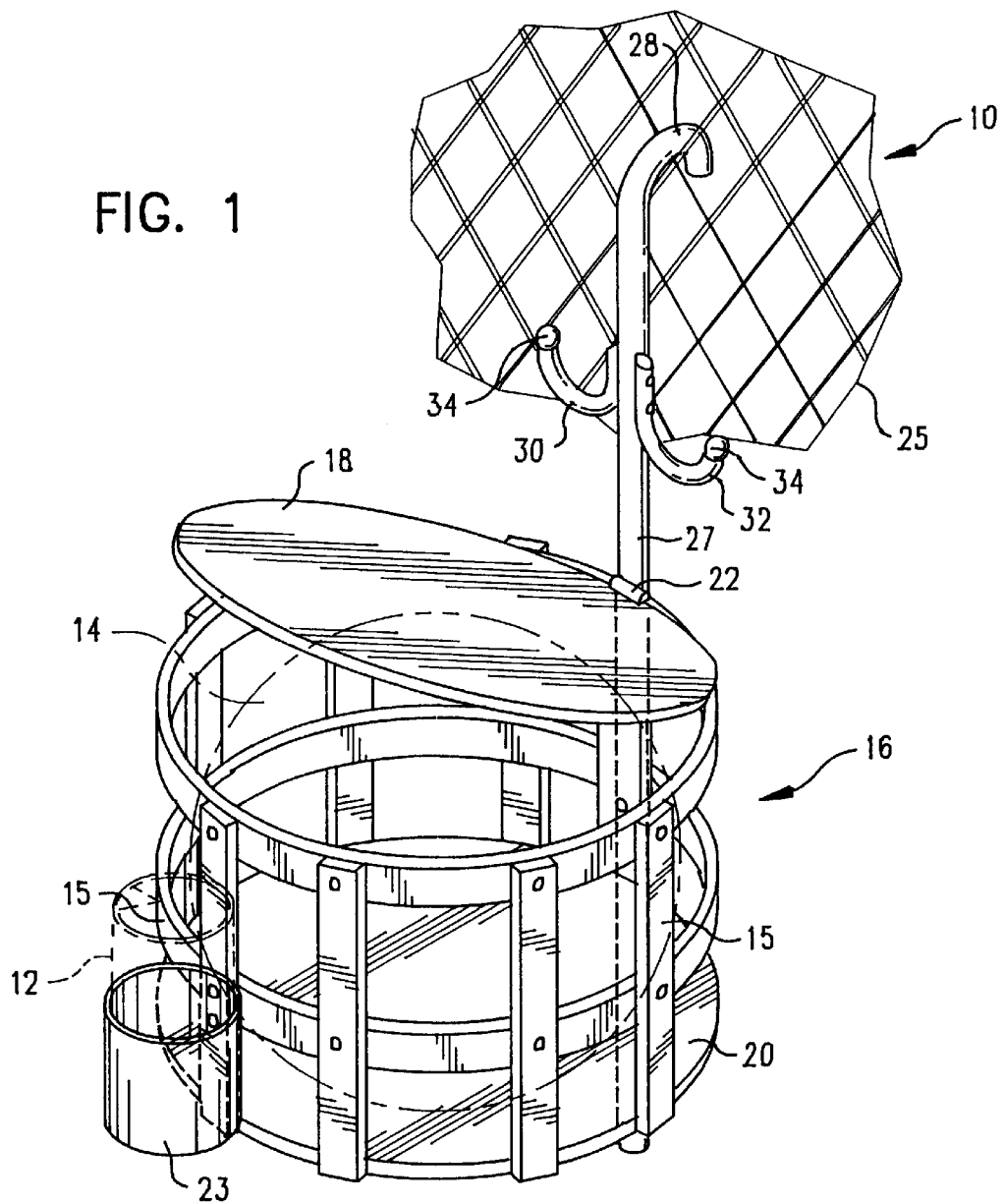
FIGS. 1 through 3 illustrate perspective views of preferred embodiments of devices in accordance with the present invention, for holding sports equipment and other items.

FIG. 1 illustrates a preferred embodiment of a device 10 in accordance with the present invention for holding items. By way of brief introduction, the device 10 includes components adapted for holding such items as a beverage container 12 (shown in phantom), a ball 14 (shown in phantom), and other items. A person can thus use the device 10 for conveniently holding these items 12 and 14.

The lower end of the device 10 includes a generally cylindrically-shaped basket or receptacle 16 for holding and retaining the ball 14. As illustrated in FIG. 1, the receptacle 16 includes walls created from a plurality of members 15 connected to one another to form a basket or framework type of arrangement. Generally flat upper and lower caps 18 and 20 respectively connect to the upper and lower edges of the walls for closing the upper and lower ends of the receptacle 16 and enclose and retain the ball 14 therein. The receptacle 16 therefore preferably has both a diameter and a depth greater than the diameter of the ball 14.

A hinge or hinges 22 located along the periphery of the upper cap 18 connect the upper cap to the top end of the receptacle 16. The upper cap 18 thus forms a lid pivotable about the hinge 22 for opening and closing the receptacle 16 for insertion and removal of the ball 14 from the receptacle. The upper cap 18 may include a latch or latches (not shown) for locking the upper cap 18 in one position or another.

The lower cap 20 of the receptacle 16 forms a generally flat base for the device 10. In this regard, the device 10 can be stood in a generally stable, free-standing upright position on the lower cap 20 on relatively flat surfaces, such as courts or fields for playing athletic games. The larger the ball 14 the receptacle 16 is sized to accommodate, the greater stability of the device 14 in a free-standing upright position. Thus, the device 10 has greater stability when including a receptacle 16 sized for larger sized balls, such as basket, soccer, foot and volley balls, as opposed to smaller balls, such as baseballs.

The upper cap 18 forms a relatively flat surface when closed for forming a seat for a person. Specifically, a person can sit on the upper cap 18 when closed and thus use the device as a chair or stool.

The device includes a second receptacle 23 for holding and retaining a beverage container 12, such as a can, cup, bottle or other container for beverages. The second receptacle 23 preferably has a generally cylindrical shape and attaches to the wall of the other receptacle 16.

As illustrated in FIG. 1, the device 10 can also be suspended from another structure, such as a chain link fence 25. In this regard, the device 10 includes a support member 27 connected to one side of the receptacle 16, and extending upward above the receptacle. Preferably, the support member 27 extends along the rear of the device 10, i.e., generally along the side opposite the receptacle 23 for holding beverage containers. The upper end of the support member 27 includes a connector or hook 28 that connects to the other structure, i.e., the chain link fence 25. In this regard, the hook 28 extends rearwardly away from the device 10 and bends downward. This hook 28 also functions as a handle for grasping and carrying the device 10.

Two side hooks 30 and 32 extend from opposite sides of the support member 27, below the other hook 28 and above the ball receptacle 16. The side hooks 30 and 32 both extend sidewardly away from the device 10, i.e., in directions generally orthogonal to the direction the top hook 28 extends. The side hooks 30 and 32 are for retaining miscellaneous items, such as towels, clothing, sports equipment and etc., and each preferably include a knob 34 capping the end of each hook.

Figure 2:
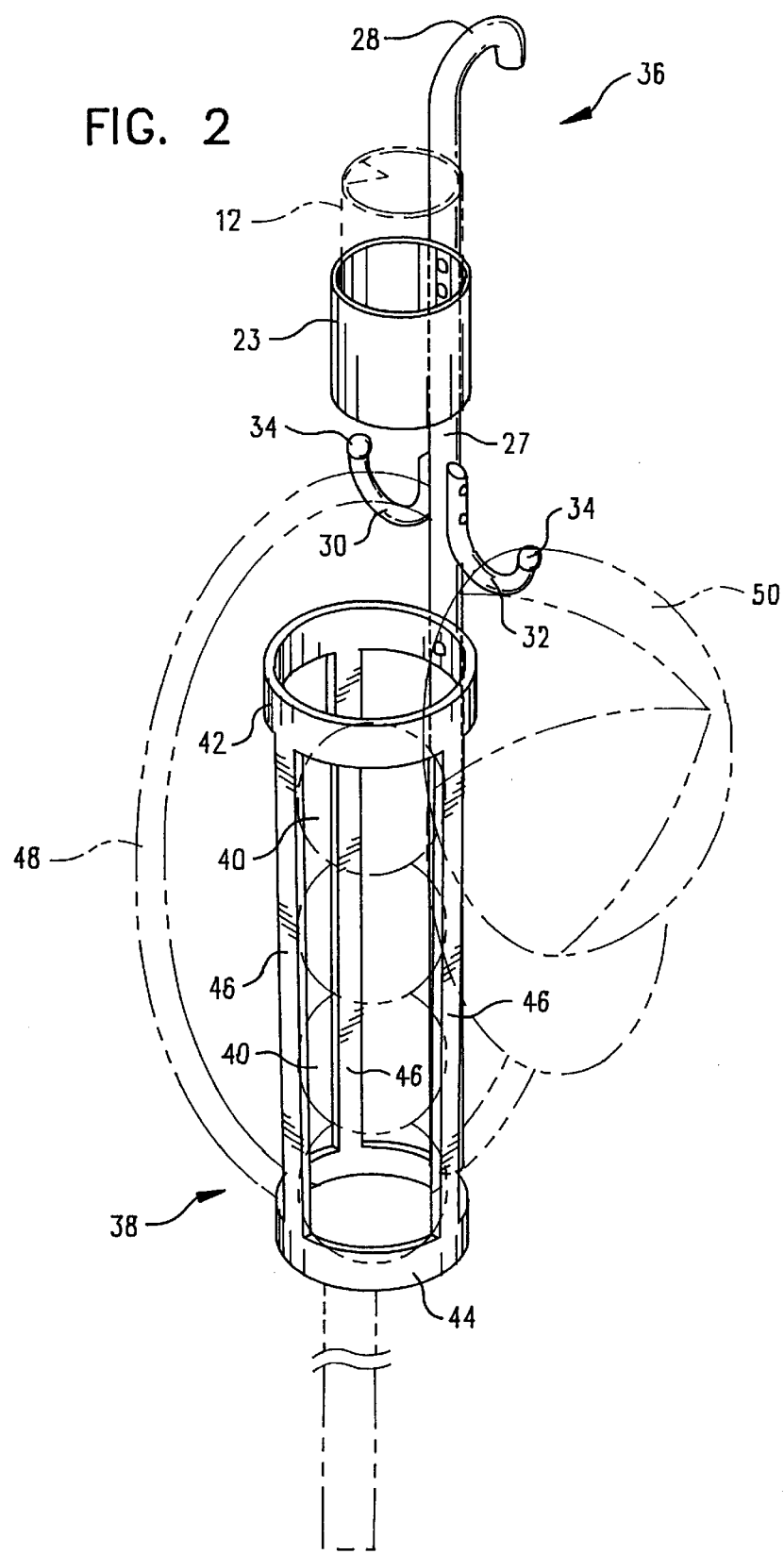

FIG. 2 illustrates another preferred embodiment of a device 36 in accordance with the present invention for holding items. This device 36 includes a support member 27 substantially identical to the support member in the previously described embodiment. Further in this regard, the support member 27 includes a connector or hook 28 at its upper end substantially identical to the top hook of the other embodiment. However, the device 36 of FIG. 2 includes a different receptacle 38 for receiving balls 40, which connects to the lower end of the support member 27.

The ball receptacle 38 substantially forms a cylindrical shape, having its central axis generally parallel to the length of the support member 27. As illustrated in FIG. 2, the receptacle 38 includes an upper annular loop 42 at its top end, axially aligned with a lower annular loop 44 at the opposite end of the receptacle. A plurality of spaced apart, generally vertical members 46 connect the loops 42 and 44 to one another. The loops 42 and 44 and the vertical members 46 thus combine to form a framework that defines the receptacle 38.

The receptacle 38 receives the balls 40 through the annular loops 42 and 44. The upper annular loop 42 and the main body of the receptacle 38 has an inside diameter slightly greater than the diameter of the balls 40. Thus, the balls 40 slide through the upper loop 42 and into the main body of the receptacle 38. The lower annular loop 44 serves as a stop. Specifically, the lower loop 44 has an inside diameter slightly smaller than the diameter of the balls 40, which prevents the balls from exiting through the lower end of the receptacle 38.

The balls 40 can be force fit through the lower annular loop 44 by application of a nominal amount of pressure because the lower loop has an inside diameter only slightly smaller than the diameter of each ball. More particularly, the balls 40 compress, and/or the loop 44 expands Sufficiently under such pressure that the balls slip through the lower loop. Once fitted through the lower annular loop 44, the balls 40 can slide freely into the main body portion of the receptacle 38. This feature permits the device 36 to be conveniently used for picking-up balls.

Specifically, the lower end of the receptacle 38 can be pressed downward against a ball 40 to force-fit the ball into the main body of the receptacle. This can be repeated to collect several balls 40 in the receptacle as shown in FIG. 2. The top hook 28 on the device 36 conveniently serves as handle when using the device for picking-up balls 40, and also functions for connecting the device to another structure as the top hook in the previously described embodiment. Preferably the device 36 has a receptacle 38 sized for receiving conventional tennis balls.

The device 36 additionally includes side hooks 30 and 32 substantially identical to the side hooks in the previously described embodiment. The side hooks 30 and 32 in the device 36 of FIG. 2, also connect to the support member 27 as with the side hooks in the previously described embodiment, and each of these hooks include a knob 34 capping the end of each hook as in the previous embodiment. The side hooks 30 and 32 in the device 36 of FIG. 2, are for retaining miscellaneous items, such as towels, clothing, sporting equipment, such as a racket 48 and cap 50 (shown in phantom).

The device 36 of FIG. 2 also includes a receptacle 23 for holding a beverage container 12, substantially identical to the beverage receptacle in the previously described embodiment. The beverage receptacle 23 in the device of FIG. 2 preferably connects to the support member 27 above the side hooks 30 and 32, and below the top hook 28.

Figure 3:
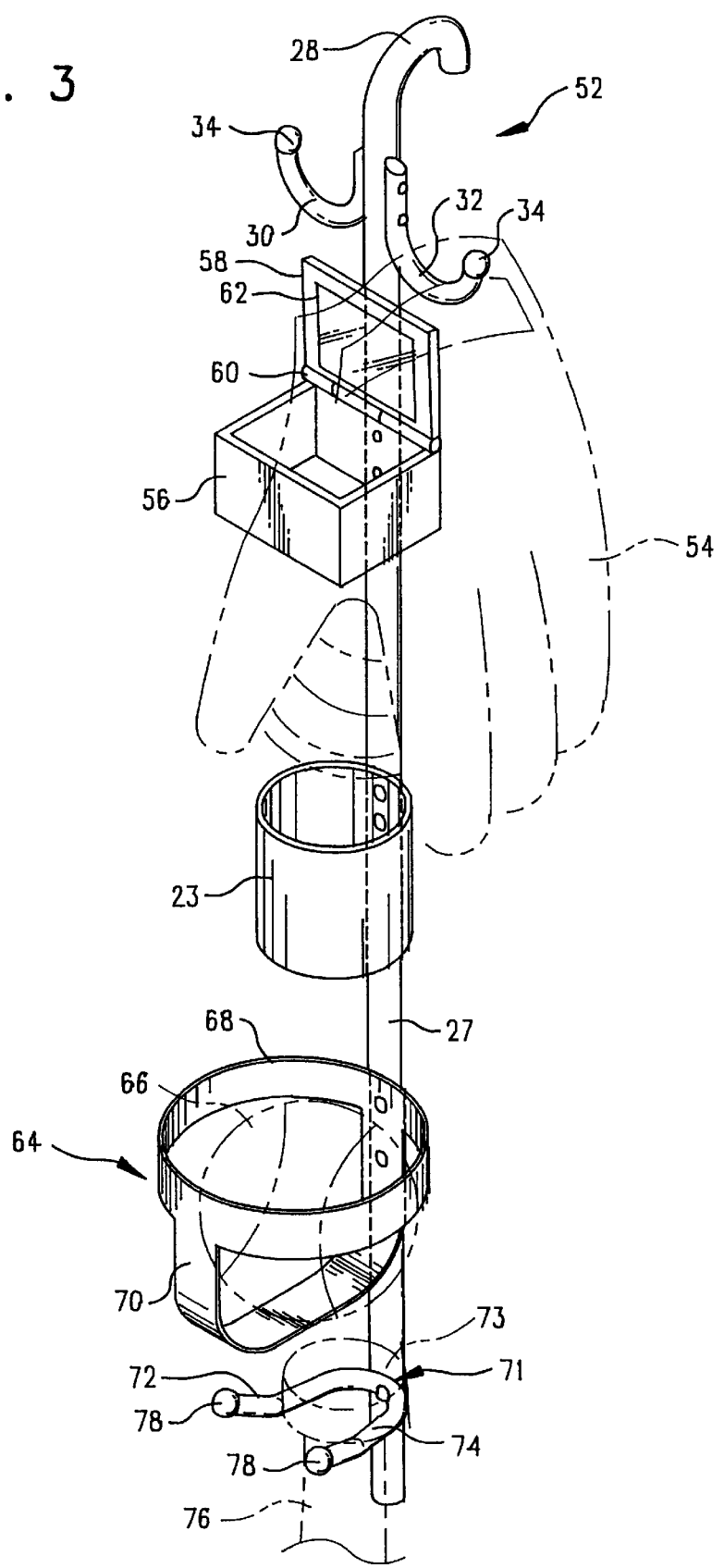

FIG. 3 illustrates yet another preferred embodiment of a device 52 in accordance with the present invention for holding items. This device 52 includes a support member 27 substantially identical to the support member in the previously described embodiments. The support member 27 includes a connector or hook 28 at its upper end substantially identical to the top hook of the other embodiments. The top hook 28 serves for connecting the device 52 to another structure as with the other embodiments.

The device 52 additionally includes side hooks 30 and 32 substantially identical to the side hooks in the previously described embodiments. The side hooks 30 and 32 connect to the support member 27 below the top hook 28, and each hook includes a knob 34 capping its end as with the side hooks of the previously described embodiments. The side hooks 30 and 32 serve for retaining miscellaneous items, such as towels, clothing, sporting equipment, such as a baseball or softball mitt 54 (shown in phantom).

A container 56 connects to the front of the support member 27, below the side hooks 30 and 32. The container 56 forms a shape generally corresponding to a right rectangular parallelepiped. A hinge 60 at the rear, upper edge of the container 56, connects the container's top to the rest of the container. The top of the container 56 thus forms a lid 58 pivotable about the hinge 60 for opening and closing the container. The lid 58 may include a mirror 62 on its inner surface as illustrated in FIG. 3, and/or a latch (not shown) for locking the lid in one or more positions. The container 56 serves for retaining miscellaneous items, such as watches, rings, bracelets, necklaces or other jewelry, eye glasses, and etc.

The device 52 also includes a receptacle 23 for holding a beverage container, substantially identical to the beverage receptacles in the previously described embodiments. The beverage receptacle 23 preferable connects to the support member 27 below the container 56.

A ball receptacle 64 connects to the support member 27 below the beverage receptacle 23 for retaining a ball 66 (shown in phantom). As illustrated in FIG. 3, the ball receptacle includes an annular loop 68 having a diameter slightly greater than the diameter of the ball 66. The loop 68 extends from the support member 27 with the plane of the loop generally orthogonal to the length of the support member 27. A cross member 70 extends downward underneath the annular loop 68 and connects opposite sides of the loop to one another. More particularly, the cross member 70 forms a shape corresponding generally to the shape of an uppercase letter "U." In this regard, the cross member 70 extends downward from the loop 68 along the support member 27, then bends to centrally cross underneath the loop, and finally bends again to extend upward and connect to the other side of the loop. The ball 66 inserts into the receptacle 64 through the loop 66, and rests against the cross member 70. Preferably, the ball receptacle 64 has dimensions sized for receiving a conventional baseball or softball.

A member 71 having a shape corresponding generally to an uppercase letter "U," connects to the support member 27 below the ball receptacle 64. The trough of the U-shaped member 71 connects to the support member 27, and the legs of the U-shape cantilever outward at generally equal elevations to form a pair of prongs 72 and 74. The prongs 72 and 74 preferably have a spacing from one another suitable for receiving the end of a conventional baseball or softball bat 76 (shown in phantom) between the prongs. As illustrated in FIG. 3, the narrower portion of the bat 76 fits between the prongs 72 and 74, with the knob 73 of the bat handle pressing downward against the upper surfaces of the prongs. The prongs 72 and 74 preferably have a slight upward bend or curve, a knob 78 capping the end of each prong, to help retain a bat 76 in position between the prongs.

Preferably, the embodiments described herein are formed primarily from plastic to minimize cost and weight. Each embodiment is preferably formed as an integral piece as much as possible, with separate components being attached to one another by any conventional method, such as welding (heat, ultrasonic or chemical), fasteners, adhesives and glues, and other conventional methods.

While preferred embodiments of the invention have been illustrated and described, it will be appreciated that various changes can be made therein while remaining within the scope of the invention. For example, ball receptacles could be created from solid parts, rather than having a basket or framework arrangement; the connector or top hook could be a snap or other fastener for connecting these devices to another structure; all of the devices could include a container for holding jewelry or other items; the prongs could be specially adapted for holding other items, such as a racket, baseball and softball mitts and etc., or simply used for retaining clothing; and the components, e.g. ball receptacle, beverage receptacle and etc., could connect to the support member in arrangements other than as shown. Since changes can be made to the illustrated embodiments of the invention, the invention should be defined by reference to the claims.

The embodiments of the invention in which an exclusive property or privilege is claimed are defined as follows:

1. A device for holding items, including a ball of a predefined radius, and a beverage container of a predefined outside diameter, the device comprising:

(a) a support member having a connector for connecting to another structure and attaching the device thereto;

(b) beverage retaining means having a receptacle for receiving and retaining a beverage container, the receptacle having an inside diameter approximately corresponding to said predefined outside diameter, the beverage retaining means being connected to the support member; and (c) ball retaining means connected to the support member for receiving and holding a ball, the ball retaining means defining a recess having a depth, wherein, when the ball retaining means receives and holds the ball, the ball is received into the recess to a depth at least equal to said predefined radius.

2. The device of claim 1, wherein the support member has opposite ends, with the connector connected to one end of the support member, the device further comprising a pair of prongs for retaining a bat, the prongs being cantilevered from the other end of the support member.

3. The device of claim 1, further comprising a container connected to the support member, the container including an opening through which items may be received into the container, and a lid for closing the opening, wherein the support member has an upper end and a lower end, the container being connected to the lower end of the support member, the container including a substantially flat base which supports the device in a freestanding position on a surface, when the connector is not connected to another structure.

4. The device of claim 1, further comprising a container connected to the support member, the container including an opening through which items may be received into the container, a lid for closing the opening, and a mirror mounted to the lid of the container.

5. The device of claim 1, wherein the ball retaining means includes a receptacle for receiving a ball, the receptacle including a lid movable from a first position in which the receptacle is open, to a second position closing the receptacle.

6. The device of claim 1, wherein the recess in the ball retaining means has a diameter corresponding to approximately twice said predefined radius.

7. The device of claim 6, wherein the ball retaining means is for receiving and retaining a plurality of balls, with the recess in the ball retaining means having a depth dimension, with the ball retaining means being also for substantially aligning balls along the depth dimension of the recess when a plurality of balls is retained in the ball retaining means.

8. The device of claim 1, wherein the ball retaining means includes a receptacle for receiving balls of a predefined diameter, the receptacle including an opening for receiving the balls, the opening having a diameter smaller than the diameter of the balls for force-fitting the balls therethrough.

9. A device for holding items, including a beverage container having a predefined length and a predefined outside diameter, comprising:

(a) a support member having an upper end and a lower end;

(b) a connector connected to the upper end of the support member for supporting the device from another structure;

(c) sports equipment holding means connected to the lower end of the support member, the sports equipment holding means being for holding at least one item of sports equipment; and (d) a receptacle for receiving and retaining a beverage container, the receptacle including a wall, wherein the wall defines an inner, circular boundary of the receptacle, with the boundary having a diameter approximately corresponding to said predefined outside diameter, the wall having a height that surrounds a substantial portion of said predefined length.

10. The device of claim 9, wherein the sports equipment holding means includes a receptacle for receiving a ball, the receptacle including a lid movable from a first position in which the receptacle is open, to a second position closing the receptacle, the receptacle having a substantially flat base which supports the device in a freestanding upright position on a surface, when the connector does not support the device from another structure.

11. The device of claim 9, wherein the device is for holding items, including balls of a predefined diameter, the sports equipment holding means including a receptacle for receiving a plurality of said balls, the receptacle having a diameter approximately corresponding to said predefined diameter, and a depth dimension at least twice said predefined diameter, the balls being aligned substantially along the depth dimension of the receptacle when a plurality of said balls are received in the receptacle.

12. The device of claim 9, wherein the sports equipment holding means includes a receptacle for receiving balls of a predefined diameter, the receptacle including an opening for receiving the balls, the opening having a diameter smaller than the diameter of the balls for force-fitting the balls therethrough.

13. The device of claim 9, wherein the sports equipment holding means includes a pair of prongs for retaining a bat.

14. The device of claim 9, further comprising a container connected to the support member, the container including an opening through which items may be received into the container, a lid for closing the opening, and a mirror.

15. A device for holding items, comprising:

(a) a support member having an upper end and a lower end;

(b) a hook connected to the upper end of the support member for hanging the device from another structure;

(c) a first receptacle connected to the support member, for receiving and retaining a ball; and (d) a container connected to the support member, the container including an opening adapted for receiving items into the container, a lid for closing the opening, and a mirror.

16. The device of claim 15, wherein the device is for holding items, including a beverage container of a predefined outside diameter, the device further comprising a second receptacle connected to the support member for receiving and retaining a beverage container, the receptacle having an inside diameter approximately corresponding to said predefined outside diameter.

17. The device of claim 15, wherein the first receptacle connects to the lower end of the support member, the first receptacle having a substantially flat base which supports the device in a freestanding position on a surface, when the hook does not hang the device from another structure.

18. The device of claim 15, further comprising a pair of prongs cantilevered from the lower end of the device for receiving and retaining a bat between the prongs.

19. The device of claim 15, wherein the first receptacle includes an opening for receiving balls of a predefined diameter, the opening having a diameter smaller than the diameter of the balls, the opening being adapted for force-fitting the balls therethrough.

* * * * *